R. C. SHEPHERD.
GEARING FOR TRACTORS.
APPLICATION FILED NOV. 27, 1915.
1,232,399.
Patented July 3, 1917.
3 SHEETS—SHEET 2.
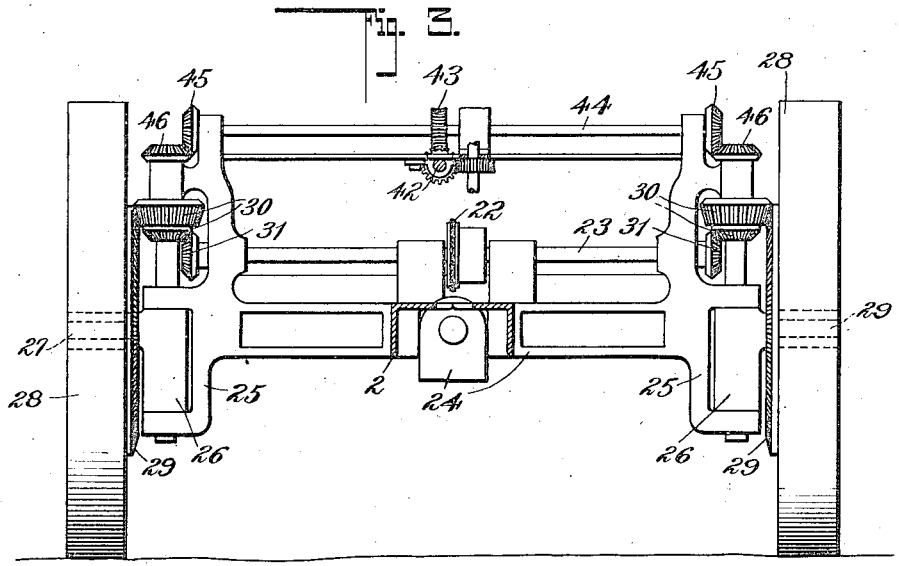
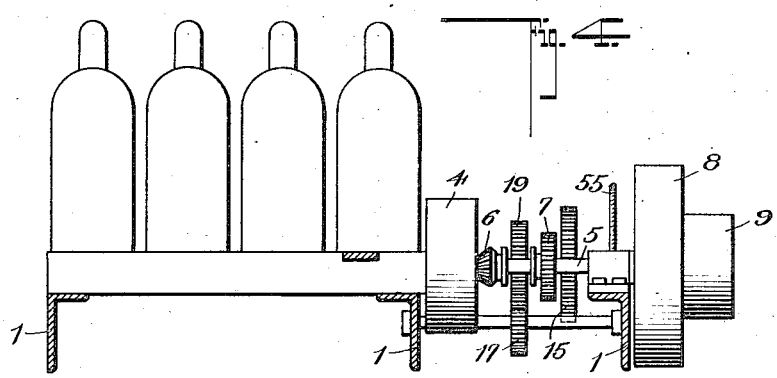
Inventor
R. C. Shepherd
Witness
Philip H. Burch
By Victor J. Evans
Attorney

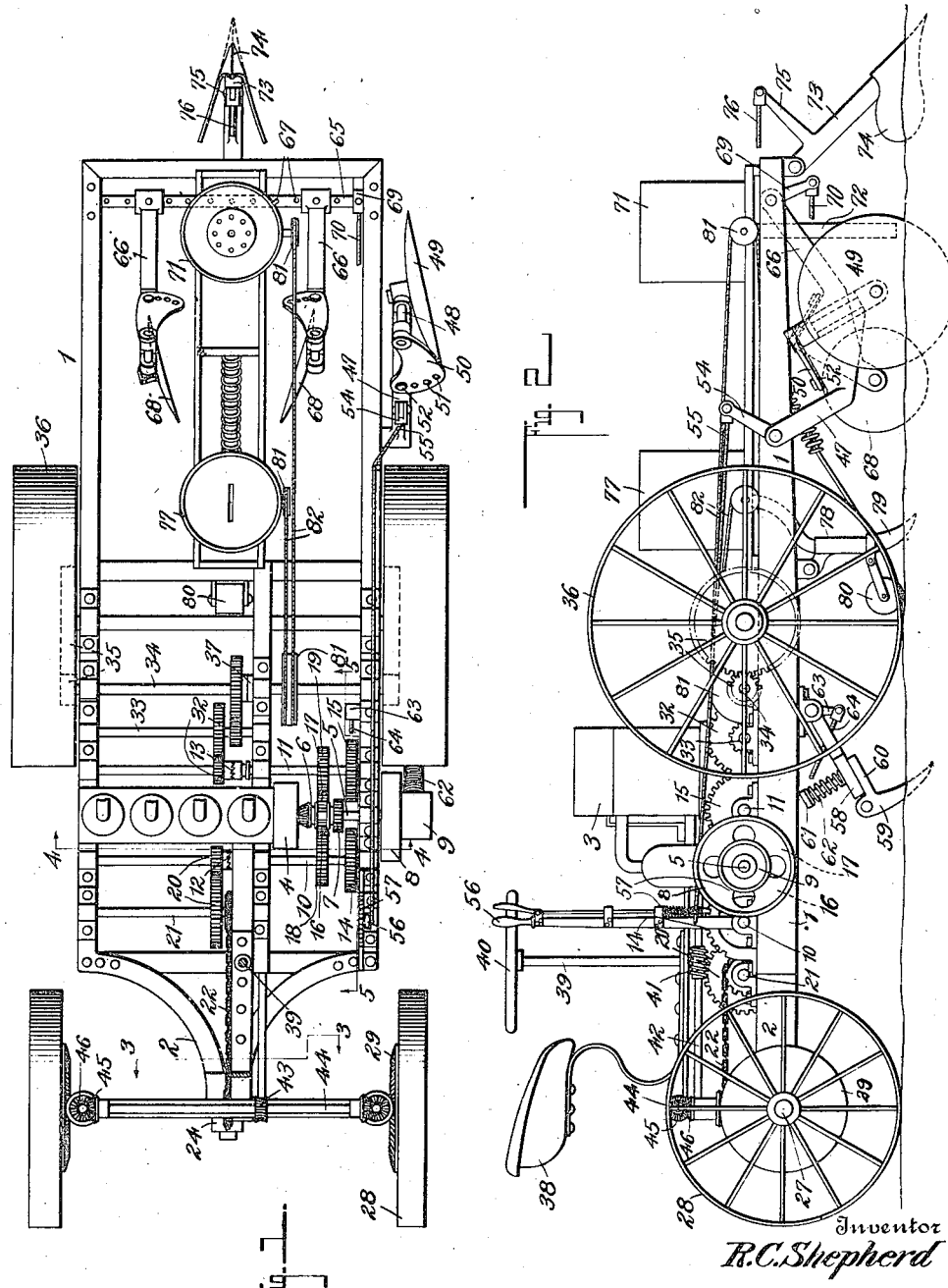

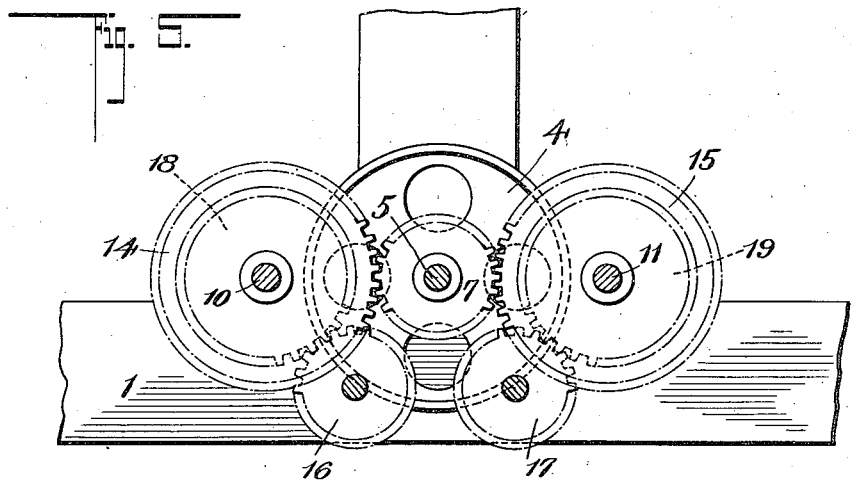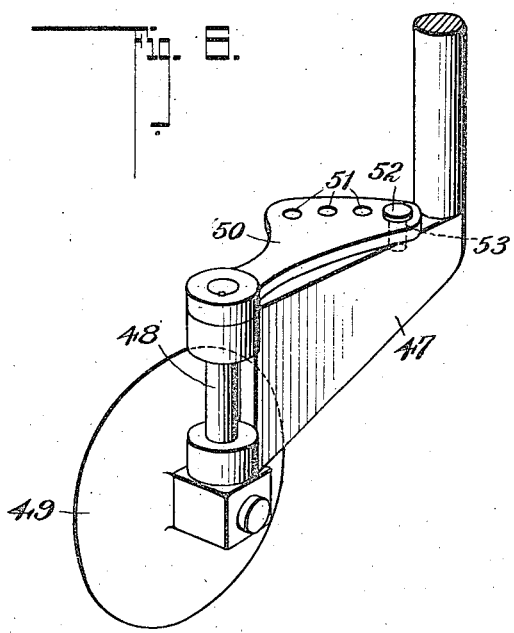

UNITED STATES PATENT OFFICE.

ROBERT C. SHEPHERD, OF THOMASVILLE, NORTH CAROLINA.

GEARING FOR TRACTORS.

1,232,399.        Specification of Letters Patent.        Patented July 3, 1917.

Application filed November 27, 1915. Serial No. 63,771.

*To all whom it may concern:*

Be it known that I, ROBERT C. SHEPHERD, a citizen of the United States, residing at Thomasville, in the county of Davidson and State of North Carolina, have invented new and useful Improvements in Gearing for Tractors, of which the following is a specification.

The invention relates to a tractor designed particularly for farm use, comprehending a construction wherein the tractor may be used for ordinary traction purposes, as a stationary motor for plowing and subsoiling land at one operation and for opening up, for planting, distributing fertilizer, bedding up for seed beds, planting the seed and covering the seed at another operation.

The improved tractor is constructed primarily for farm use and is designed with a view to enabling the single tractor to adapt itself for as many distinct farm purposes as possible.

The invention in the preferred form of details will be described in the following specification, reference being had particularly to the accompanying drawings, in which:

Figure 1 is a plan of the improved tractor;

Fig. 2 is a side elevation of the same;

Fig. 3 is a section on line 3—3 of Fig. 1;

Fig. 4 is a section on line 4—4 of Fig. 1;

Fig. 5 is a section on line 5—5 of Fig. 1;

Fig. 6 is a detailed perspective of the plow disk adjusting means.

The improved tractor comprises a main frame 1 preferably rectangular in outline, and a forward end reduced in width as shown at 2 to the extreme forward point, to provide for turning movement of the steering wheel. The main frame is covered with suitable platforms and mounted upon the same at an appropriate point is a motor 3 preferably in the form of a gasolene engine with all necessary operating parts, and which need no further detailed description herein. The fly wheel 4 on the main shaft of the engine is connected to the main drive shaft 5 by a clutch 6 adapted to be actuated by the operator in any desired manner. Mounted upon the drive shaft is a gear 7 adapted to be shifted by any desired form of gear shift, and designed to be operated to drive the tractor in either one direction or the other as may be desired in advance uses thereof. On the end of the main driving shaft is mounted a drum 8 designed to be arranged for service as a plow drum for any accessible type of plow mechanism, and beyond the drum is a pulley 9 adapted while the tractor is stationary to serve as an auxiliary pulley for any desired operation. Auxiliary drive shafts 10 and 11 are mounted on opposite sides of the main drive shaft with respect to the ends of the frame, these auxiliary drive shafts extending transverse the frame and each being formed in two sections controlled by clutches 12 and 13 respectively, so that the driving section of either auxiliary drive shaft may be cut out at will by disconnecting its clutch. Shifting gear 7 is adapted for movement in one direction to coöperate with gears 14 and 15 on the respective auxiliary drive shafts, and a movement in the opposite direction to coöperate through intermediate stud gears 16 and 17 with gears 18 and 19 on the auxiliary drive shafts. It is therefore apparent that through shifting the gear 7 the auxiliary drive shafts may be simultaneously operated in either direction while with the gear in neutral the main drive shaft will operate the band pulley 9. The clutch connected end of the auxiliary drive shaft 10 is connected through gearing 20 with an intermediate shaft 21 arranged transverse the frame, and the latter through a chain and sprocket connection 22 with a transverse shaft 23 mounted in the head frame 24. The head frame is enlarged at the respective ends to provide brackets 25 in which are mounted vertical spindles 26, the spindles carrying lateral stub axles 27 on which are mounted the forward ground wheels 28. The ground wheels are provided with bevel gear strips 29 of annular formation which through beveled gears 30 are connected with beveled gears 31 on the ends of the shaft 23. By this means the forward ground wheels 28 are rotated in the operation of the auxiliary drive shafts 10.

The clutch connection section of the auxiliary drive shaft 11 is connected through gearing 32 to drive the shaft 33 and the latter in turn driving a differential shaft 34 operating through gears 35 to directly actuate the main ground wheels 36, the differential shaft having a differential 37 of any approved form to permit independent movement of the ground wheels 36 as will be understood.

Mounted on the end of the frame adjacent the so called forward ground wheels is a seat 38 and in advance of the same a steering post 39 controlled by a wheel 40. The lower end of the steering post through suitable worm gearing 41 operates a longitudinally extending shaft 42 which in the head frame 24 through beveled gearing 43 operates a transverse shaft 44 mounted in the head frame. The ends of the shaft 44 are provided with beveled gears 45 which mesh with beveled gears 46 fixed upon the spindle 26, so that operation of the steering post will turn the spindles 26 and so turn the ground wheels 28 for steering purposes.

Pivotally mounted upon one side bar of the main frame is a plow standard 47. The standard is approximately of L-shape, the forward end being formed with an opening to receive a rod 48 on the lower end of which is mounted a cutting disk 49 for plowing purposes. The upper end of the rod 48 is provided with a head 50 having a series of openings 51 in the relatively forward edge thereof. A bolt 52 is arranged to coöperate with any of said openings and a fixed opening 53 in a bracket, whereby the angle inclination of the disk may be varied at will. The bracket or standard 47 has an upwardly extending arm 54 connected through the medium of a cable 55 with an adjusting lever 56 mounted on a platform and arranged within reach of the operator so that the cutting depth of the disk may be regulated at will, the lever having the usual locking dog and segment 57 for securing the parts in their adjusted relation. The plowing disk is arranged in line with one of the ground wheels 36 and to provide a desired plowing depth in the use of the device I prefer that the ground wheel 36 be followed by a subsoiler including an arm 58 pivotally supported upon the main frame and having pivoted at the upper end thereof, a subsoiling tool 59. The tool is provided with a forward projection 60 underlying the arm 58 for and connected thereto by a bolt 61 passing loosely through the arm and encircled by a spring 62. This construction permits the sub-soiling tool to yield when meeting an obstruction and to return to operative position after passing over said obstruction. The arm 58, or rather the pivot of said arm is provided with a projection 63 connected through the medium of a cable 64 and an operating lever (not shown) to secure desired adjustment.

At what, for a purpose of this description, may be termed the rear end of the frame, there is mounted in the side bars of the main frame a shaft 65 on which is loosely and slidably arranged plow standards 66. The standards are held in adjusted position longitudinally of the shaft by being pinned thereto through openings 67 as will be plain from the drawings. The plow standards 66 are practically identical with the plow standard previously described carrying disks 68 preferably of slightly different diameter as these disks are designed to act as ridgers as will presently appear, the plow standards in this instance extending rearwardly or in the opposite direction from the plow standard first mentioned. The plow standards 66 have arms 69 connected by cables 72 with suitable actuating levers not shown. Mounted upon the platform or on the main frame is a fertilizer distributer in the form of a box or container 71 having a discharge chute 72 with its lower open end above the surface of the ground being operated upon. An ordinary plow standard 73 carrying a plow 74 is pivoted to the main frame beyond the rear end thereof, this standard having an arm 75 connected by a cable 76 with an operating lever not shown. In rear of the fertilizer distributer is arranged a seeder 77 having a delivery tube 78 on the lower end of which there is mounted a small plow 79 and in rear of which there is arranged a covering roller 80. The differential shaft through the medium of belt pulleys 81 secured thereto and belts 82 operates the fertilizer distributer and seeder respectively.

The plow 74 is designed to open up a furrow in which the fertilizer is distributed following which the ridging plows operate to throw the soil into a ridge formation. In this ridge plow 79 makes a small furrow into which seed is dropped and covered by the roller 80.

As thus constructed and arranged it will be obvious that for ordinary traction purposes such as furnishing the motive power for any usual farm implement the tractor may be driven with the ground wheels 28 as the forward or advance wheels by connecting the shifting gears 7 with the proper gears of the auxiliary drive shafts. In use for other purposes such as plowing, seeding and the like, the tractor is preferably driven in the opposite direction, at which time the steering wheels become the ground wheels by shifting the gear 7 into engagement with the intermediate gears 16 and 17. It is further apparent that either set of ground wheels may be idle so far as driving purposes are concerned by disconnecting either desired clutch 12 or 13. In steering particularly in making a sharp turn it is desirable to disconnect the drive wheels 36 from the motor in order that one of said wheels may act as a pivot.

The respective clutches, gear shifts and adjustments for the plows, ridgers and other operative parts may be through the medium of the pedals, hand levers, or other mechanism designed for convenient manual control, the lever herein shown being merely illustrative of the type of such structure as the particular mechanisms to be used for different purposes are ordinary and usual and detailed description is not deemed necessary.

What is claimed as new is:

A gearing drive for tractors including a main drive shaft, auxiliary drive shafts extended in the same direction with and in spaced parallel relation to the main drive shaft, gears secured on the auxiliary drive shafts, auxiliary gears secured on such auxiliary drive shafts, stub shafts, gears mounted on said stub shafts and meshing with the said auxiliary gears, and a gear slidably mounted on the main drive shaft and adapted to be engaged with the first mentioned gears of the auxiliary drive shafts, or with the gears mounted on the stub shafts, whereby to permit the operation of the auxiliary drive shafts in either direction.

In testimony whereof I affix my signature in presence of two witnesses.

ROBERT C. SHEPHERD.

Witnesses:
J. W. PEACOCK,
T. H. WILSON.